(12) United States Patent  
Huang

(10) Patent No.: US 9,287,540 B2  
(45) Date of Patent: Mar. 15, 2016

(54) SEPARATORS FOR A LITHIUM ION BATTERY

(75) Inventor: Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1144 days.

(21) Appl. No.: 13/149,117

(22) Filed: May 31, 2011

(65) Prior Publication Data

US 2012/0308872 A1 Dec. 6, 2012

(51) Int. Cl.
- *H01M 6/42* (2006.01)
- *H01M 2/14* (2006.01)
- *H01M 10/0525* (2010.01)
- *H01M 2/16* (2006.01)
- *H01M 2/34* (2006.01)
- *H01M 10/0566* (2010.01)

(52) U.S. Cl.
CPC ............. *H01M 2/145* (2013.01); *H01M 2/166* (2013.01); *H01M 10/0525* (2013.01); *H01M 2/1653* (2013.01); *H01M 2/1673* (2013.01); *H01M 2/348* (2013.01); *H01M 10/0566* (2013.01); *Y02E 60/122* (2013.01); *Y02T 10/7011* (2013.01)

(58) Field of Classification Search
CPC . H01M 2/1673; H01M 2/1653; H01M 2/166; H01M 2/145; H01M 10/0525; H01M 10/0566; H01M 2/348; Y02E 60/122; Y02E 10/7011
USPC .................. 429/129, 251, 142, 246, 254, 149
See application file for complete search history.

(56) References Cited

U.S. PATENT DOCUMENTS

| 5,744,264 | A | * | 4/1998 | Barker | 429/223 |
| 2006/0008700 | A1 | * | 1/2006 | Yong et al. | 429/144 |

FOREIGN PATENT DOCUMENTS

| CN | 101222032 A | 7/2008 |
| CN | 101714619 A | 5/2010 |
| CN | 102035043 A | 4/2011 |

OTHER PUBLICATIONS

U.S. Appl. No. 12/974,094; Title: Battery Separators With Variable Porosity; filed Dec. 10, 2010; First Named Inventor: Hamid G. Kia.
U.S. Appl. No. 12/974,269; Title: Battery Separators With Variable Porosity; filed Dec. 10, 2010; First Named Inventor: Hamid G. Kia.

(Continued)

*Primary Examiner* — Milton I Cano  
*Assistant Examiner* — Jimmy K Vo  
(74) *Attorney, Agent, or Firm* — Reising Ethington P.C.

(57) ABSTRACT

A separator for use in a lithium ion battery to provide a physical and electrically insulative mechanical barrier between confronting inner face surfaces of a negative electrode and a positive electrode may be formed predominantly of heat-resistant particles. The heat-resistant particles, which have diameters that range from about 0.01 μm to about 10 μm, are held together as a thin-layered, handleable, and unified mass by a porous inert polymer material. The high content of heat-resistant particles amassed between the confronting inner face surfaces of the negative and positive electrodes provides the separator with robust thermal stability at elevated temperatures. Methods for making these types of separators by a phase-separation process are also disclosed.

16 Claims, 2 Drawing Sheets

(56) References Cited

OTHER PUBLICATIONS

U.S. Appl. No. 13/045,563; Title: Integral Bi-Layer Separator-Electrode Construction for Lithium-Ion Batteries; filed Mar. 11, 2011 First Named Inventor: Xiaosong Huang.

U.S. Appl. No. 13/217,455; Title: Lithium Ion Battery With Electrolyte-Embedded Separator Particles; filed 08/25/201; First Named Inventor: Ion C. Halalay.

U.S. Appl. No. 13/149,205; Title: Methods of Making Lithium Ion Battery Separators; filed May 31, 2011; First Named Inventor: Xiaosong Huang.

* cited by examiner

SEPARATORS FOR A LITHIUM ION BATTERY

TECHNICAL FIELD

The technical field of this disclosure relates generally to separators for a secondary lithium ion battery and, more specifically, to a separator formed predominantly of heat-resistant particles. The many heat-resistant particles are held together as a thin-layered, handleable, and unified mass by a porous inert polymer material. In an electrochemical battery cell of a lithium ion battery, the separator is situated between confronting inner face surfaces of a positive electrode and a negative electrode under an applied compressive force. Methods for making this type of separator by phase-separation are also disclosed.

BACKGROUND

Secondary (i.e., rechargeable) lithium ion batteries have been implemented as a power source into a wide variety of stationary and portable applications. Their structure and electrochemical reaction mechanism provide them with several desirable characteristics including a relatively high energy density, a relatively low internal resistance, a general non-appearance of any memory effect when compared to other types of rechargeable batteries, for example, nickel-cadmium batteries, and a low self-discharge rate. These characteristics have made lithium ion batteries the preferred mobile power source for portable consumer electronics such as laptop computers and cell phones. Larger-scale versions that interact with a multitude of interconnected systems have also been designed and manufactured by the automotive industry in an effort to improve vehicle fuel efficiency and reduce atmospheric pollution. The powertrains of hybrid electric vehicles (HEV) and extended range electric vehicles (EREV), for example, rely on the cooperative effort of lithium ion batteries and a hydrocarbon-fueled internal combustion engine to generate torque for vehicle propulsion.

A lithium ion battery generally contains one or more individual electrochemical battery cells that include a negative electrode, a positive electrode, and a porous polymeric separator sandwiched between the confronting inner face surfaces of the electrodes under a compressive force. The negative electrode generally includes a lithium host material that stores intercalated lithium at a relatively low electrochemical potential (relative to a lithium metal reference electrode). The positive electrode generally includes a lithium-based active material that stores intercalated lithium at a higher electrochemical potential than the lithium host material (relative to the same lithium metal reference electrode). The interadjacent porous separator includes opposed major surfaces that intimately contact the confronting inner face surfaces of the electrodes, and has typically been composed of a polyolefin such as polyethylene and/or polypropylene. A main function of the separator is to provide a porous and electrically insulative mechanical support barrier between the negative and positive electrodes. Each of the negative electrode, the positive electrode, and the separator is wetted with a liquid electrolyte solution that can communicate lithium ions. The liquid electrolyte solution is typically a lithium salt dissolved in a non-aqueous liquid solvent.

An interruptible external circuit electrically connects the negative electrode and the positive electrode to provide an electrical current path around the separator to electrochemically balance the migration of lithium ions. Metallic current collectors intimately associated with each electrode supply and distribute electrons to and from the external circuit depending on the operating state of the electrochemical battery cell. The external circuit can be coupled to an electrical load (during discharge) or an applied voltage from an external power source (during charging) through conventional electronic connectors and related circuitry. A voltage of approximately 2.5V to 4.3V is usually attained in each electrochemical battery cell during battery discharge. Greater overall battery power levels can be achieved, if necessary, by linking together a suitable number of similar electrochemical battery cells with their negative and positive electrodes connected in series or in parallel to corresponding common terminals. Current lithium ion batteries intended to be used in a vehicle powertrain typically include anywhere from 10 to 150 individual electrochemical battery cells. Several of these lithium ion batteries can be further connected in series or in parallel and packaged together to form a lithium ion battery pack that achieves a desired overall voltage and current capacity.

The individual electrochemical battery cell of a lithium ion battery operates by reversibly transporting lithium ions between the negative electrode and the positive electrode. The liquid electrolyte solution facilitates transport of the lithium ions through the separator. The flow direction of the lithium ions depends on whether the electrochemical batter cell is operating in a discharge state or a charge state. The lithium ions migrate from the negative electrode to the positive electrode during discharge and vice-versa during charging. The flow direction of the electrons through the external circuit mimics that of the lithium ions.

The discharge phase of the electrochemical battery cell can proceed when the negative electrode contains a sufficiently high concentration of intercalated lithium while the positive electrode is sufficiently depleted. The interruptible external circuit, when closed, provokes extraction of the intercalated lithium from the negative electrode. The extracted lithium splits into lithium ions and electrons. The lithium ions dissolve into the liquid electrolyte solution and migrate through the separator towards the positive electrode where they intercalate into the lithium-based active material. The electrons flow through the external circuit from the negative electrode to the positive electrode (with the help of the metallic current collectors) to balance these half-reactions. The flow of electrons through the external circuit can be harnessed and fed through the external load until the concentration of intercalated lithium in the negative electrode falls below a minimum effective level or the external circuit is opened.

The charge phase of the electrochemical battery cell can proceed after a partial or full reduction of its available capacity (through the discharge phase). To charge or re-power the cell, the external circuit is subjected to an applied voltage that originates from an external power source and which is sufficient in magnitude to accomplish charging in a reasonable time frame. The applied voltage drives the reverse of the discharge phase electrochemical half reactions; that is, during charging, intercalated lithium is extracted from the positive electrode to produce lithium ions and electrons. The lithium ions are carried back to the negative electrode through the separator and the electrons are driven back to the negative electrode through the external circuit. The lithium ions and the electrons reunite and replenish the negative electrode with intercalated lithium for the next battery discharge phase. Many thousands of substantially full-power discharge/charge cycles can be accomplished over the practical lifetime of the electrochemical battery cell.

The lifetime and performance of the electrochemical battery cell can be adversely impacted by a wide variety of expected and unforeseen factors. Exposure of the electrochemical battery cell to temperatures of 100° C. and above can cause the polyolefin separator to shrink, soften, and even melt if the temperature approaches 130° C. Such high temperatures can be attributed to charging-phase heat generation, ambient atmospheric temperature, or some other source. The temperature-initiated physical distortion of the polyolefin separator may ultimately permit direct electrical contact between the negative and positive electrodes and cause the electrochemical cell to short-circuit. Battery thermal runaway is also a possibility if the electrodes come into direct electrical contact with one another to an appreciable extent. A separator that can function reliably at the high-temperatures possibly encountered in an electrochemical battery cell of a lithium ion battery without affecting lithium ion movement is therefore needed.

SUMMARY OF THE DISCLOSURE

A separator for use in a lithium ion battery that retains its functionality at high operating temperatures includes a collection of heat-resistant particles held together in a thin, handleable layer by a relatively small amount of a porous inert polymer material. The heat-resistant particles range in size from about 0.01 μm to about 10 μm and are randomly stacked and arranged to a thickness of about 20 μm to about 50 μm with the outermost, surface exposed heat-resistant particles delineating opposed major face surfaces of the separator. The many heat-resistant particles naturally form a coextensive network of interconnected interstices that extends through the separator between the opposed major face surfaces. The porous inert polymer material pervades these naturally-formed interstices to bond and hold the heat-resistant particles together as a unified, handleable mass yet still permit infiltration of an appropriate liquid electrolyte solution.

The heat-resistant particles are thermally stable at temperatures below 250° C. They may be ceramic particles, cross-linked thermoset polymer particles, and/or engineering thermoplastic polymer particles. Some examples of suitable ceramic particles include alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, and petalite. Some examples of suitable cross-linked thermoset polymer particles include those of polyimides, polyurethanes, phenol-formaldehyde resins, melamine formaldehyde resins, and epoxy resins. Some examples of suitable engineering thermoplastic polymer particles include those of a polyimide, polyethylene terephthalate, polyphenylene sulfide, polyetherketone, polyether ether ketone, polyphenylsulfone, and a polysulfone. The porous inert polymer material that holds together the heat-resistant particles may be any polymer material suitable for use in the operating environment of a lithium ion battery. Some examples of the porous inert polymer material include polyetherimide (PEI), polyvinylidene fluoride (PVdF), polyacrylonitrile (PAN), poly(methyl methacrylate) (PMMA), polyoxymethylene (POM), or mixtures thereof. The porosity or void volume of the porous inert polymer material is preferably about 20% to about 80%.

The separator is intended to be used in the assembly of an electrochemical battery cell for a lithium ion battery. The separator may be situated between a negative electrode and a positive electrode and be infiltrated with an appropriate liquid electrolyte solution. The heat-resistant particles present on the major face surfaces of the separator contact confronting inner face surfaces of the negative and positive electrodes under an applied compressive force. The separator electrically insulates and physically separates the electrodes to prevent a short-circuit while remaining permeable to the internal passage of lithium ions (and related anions) through the liquid electrolyte solution. When assembled, the entire thickness of the electrochemical cell (positive electrode, negative electrode, and separator) is usually between about 80 μm and about 350 μm. A plurality of these electrochemical cells, often numbering from 10 to 150, can be connected in series or in parallel with many other electrochemical cells to form a lithium ion battery which, in turn, can be connected in series or in parallel with several other lithium ion batteries to form a lithium ion battery pack. The relatively thin and flexible nature of the electrochemical cells allows them to be rolled, folded, bent, or otherwise maneuvered into a variety of lithium ion battery configurations depending on design specifications and spatial constraints.

The high content of the heat-resistant particles amassed between the confronting inner face surfaces of the electrodes provides the separator with robust thermal stability well above 130° C. The heat-resistant particles will not soften, melt, swell, or chemically react with the liquid electrolyte solution even at the extreme ends of the conceivable operating temperature window of the lithium ion battery; rather, they remain compressed in place between the confronting inner face surfaces of the negative and positive electrodes. Nor will the heat-resistant particles sacrifice lithium ion conductivity at normal or elevated temperatures. The lithium ions can migrate around the heat-resistant particles and through the porous inert polymer material without much resistance. This is because the very small size of dissolved lithium ions in the liquid electrolyte solution can easily traverse the pore openings contained in the porous inert polymer material.

The fact that the porous inert polymer material may soften or melt at elevated temperatures (i.e., above 100° C.) does not significantly impact the structure or functionality of the separator. As mentioned before, the separator is compressed between the negative electrode and the positive electrode by an applied compressive force to promote intimate contact between the separator and each electrode at their respective contacting interfaces. The applied compressive force is also sufficient to prevent collapse or fragmentation of the heat-resistant particles that mostly constitute the separator should the porous inert polymer material that binds the many particles together soften or melt. The compressive and frictional forces acting on the heat-resistant particles are generally strong enough to withstand the effects of volumetric, structural, and/or phase changes that may occur in the porous inert polymer material. In fact, upon softening or melting, the porous inert polymer material would likely stay confined to a localized spatial volume defined by surrounding heat-resistant particles and then re-solidify when the temperature falls to a sufficient extent.

The separator can be fabricated by a phase-separation process in which the porous inert polymer material is precipitated out of a polymer solution that has been imbibed into the interstices of a layer of the heat-resistant particles. The free-standing separator produced by this process is handleable and can be assembled into an electrochemical battery cell between the negative and positive electrodes by conventional techniques without falling apart. The separator is situated between the negative and positive electrodes under an applied compressive force so that the heat-resistant particles extend between the confronting inner face surfaces of the electrodes to provide a porous and non-electrically conductive physical barrier. The porous inert polymer material contained in the separator allows the separator to be handled and situated between the electrodes during assembly of the electrochemical battery cell.

The phase-separation separator fabrication process involves forming a layer of the heat-resistant particles to a thickness consistent with the desired thickness of the separator such as, for example, between about 20 μm and about 50 μm. To form this layer, a liquid dispersion of the heat-resistant particles may be applied to a surface at a generally uniform thickness by any suitable technique followed by removal of the liquid. The layer of the heat-resistant particles is then soaked with the polymer solution. The polymer solution includes a relatively small amount of an inert polymer material, for example, between about 0.1 and 15 wt. %, dissolved in a miscible solvent mixture conducive to polymer phase separation. The miscible solvent mixture contains a polymer solvent and a polymer non-solvent with a higher boiling point than the polymer solvent. An appropriate volumetric ratio of the polymer solvent to the polymer non-solvent in the miscible solvent mixture ranges from about 5:1 to about 120:1.

The layer of the heat-resistant particles imbibed with the polymer solution is then heated to precipitate the porous inert polymer material through phase-separation. The applied heat does not affect the heat-resistant particles but does selectively evaporate the polymer solvent first followed by the polymer non-solvent. Evaporation of the polymer solvent causes the dissolved inert polymer material to precipitate out of the polymer solution. The precipitated inert polymer material and the polymer non-solvent remain significantly intermingled but phase separated at this point. The subsequent evaporation of the polymer non-solvent leaves behind empty pore openings to form the porous inert polymer material. When the miscible solvent mixture is completely evaporated, the porous inert polymer material, which has a porosity of about 20% to 80%, is formed and settles coextensively throughout the interstices naturally contained in the layer of the heat-resistant particles. The binding strength of the porous inert polymer material is sufficient to hold the heat-resistant particles together into a thin, handleable, and unified layer.

DETAILED DESCRIPTION OF PREFERRED EMBODIMENTS

Figure 1:
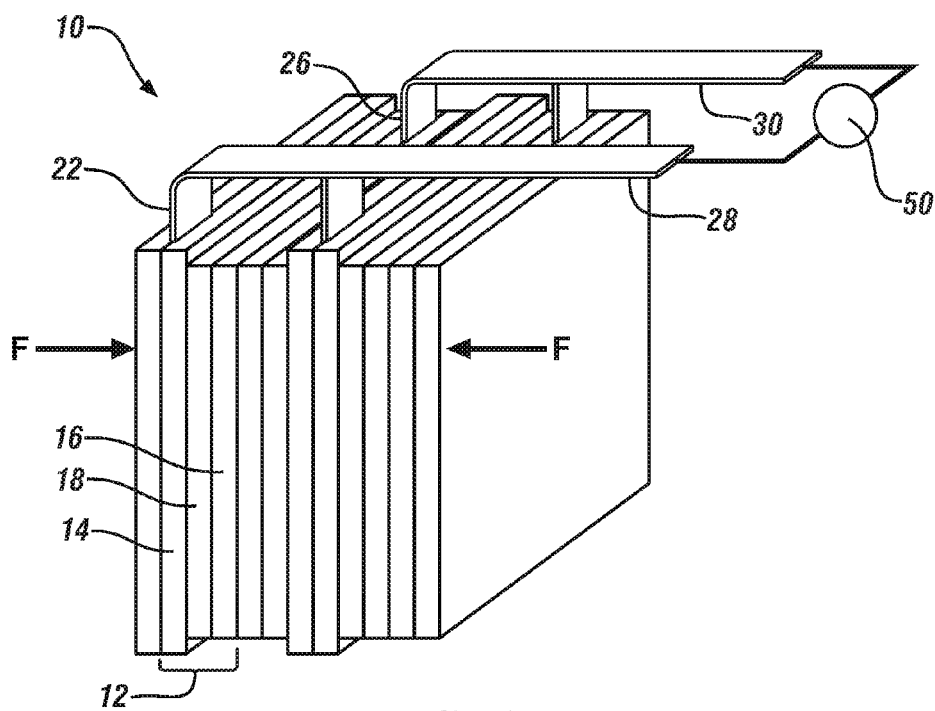
FIG. 1 is a generalized perspective illustration of a lithium ion battery that includes several adjacent electrochemical battery cells, each of which includes a negative electrode, a positive electrode, and a separator sandwiched between the two electrodes.

An exemplary and generalized illustration of a lithium ion battery 10 is depicted in FIG. 1. The lithium ion battery 10 shown here includes several rectangularly-shaped electrochemical battery cells 12 that are each bracketed by metallic current collectors. The electrochemical battery cells 12 are stacked side-by-side in a modular configuration and connected in series (although a parallel connection is also permitted). The lithium ion battery 10 can be connected serially or in parallel to other similarly constructed lithium ion batteries to form a lithium ion battery pack that exhibits the voltage and current capacity demanded for a particular application. It should be understood the lithium ion battery 10 shown here is only a schematic illustration. FIG. 1 is meant to show the relative position and physical interactions of the various components that constitute the electrochemical battery cells 12 (i.e., the electrodes and the separator); it is not intended to inform the relative sizes of the electrochemical battery cells' components, to define the number of electrochemical battery cells 12 in the lithium ion battery 10, or to limit the wide variety of structural configurations the lithium ion battery 10 may assume. Various structural modifications to the lithium ion battery 10 shown in FIG. 1 are possible despite what is explicitly illustrated.

The electrochemical battery cell 12 contained in the lithium ion battery 10 includes a negative electrode 14, a positive electrode 16, and a separator 18 situated between the two electrodes 14, 16. Each of the negative electrode 14, the positive electrode 16, and the separator 18 is wetted with a liquid electrolyte solution that is able to communicate lithium ions. A negative-side metallic current collector 20 that includes a negative polarity tab 22 is located between the negative electrodes 14 of adjacent electrochemical cells 12. Likewise, a positive-side metallic current collector 24 that includes a positive polarity tab 26 is located between neighboring positive electrodes 16. The negative polarity tab 22 is electrically coupled to a negative terminal 28 and the positive polarity tab 26 is electrically coupled to a positive terminal 30. The electrochemical battery cell 12 and the metallic current collectors 20, 24 are pressed together by a compressive force F normally applied by the battery's housing or an internal structural component such as an end plate or divider. This applied compressive force F presses the metallic current collectors 20, 24, against the electrodes 14, 16 and the electrodes 14, 16 against the separator 18 to achieve intimate interfacial contact between the adjacent components.

Figure 2:
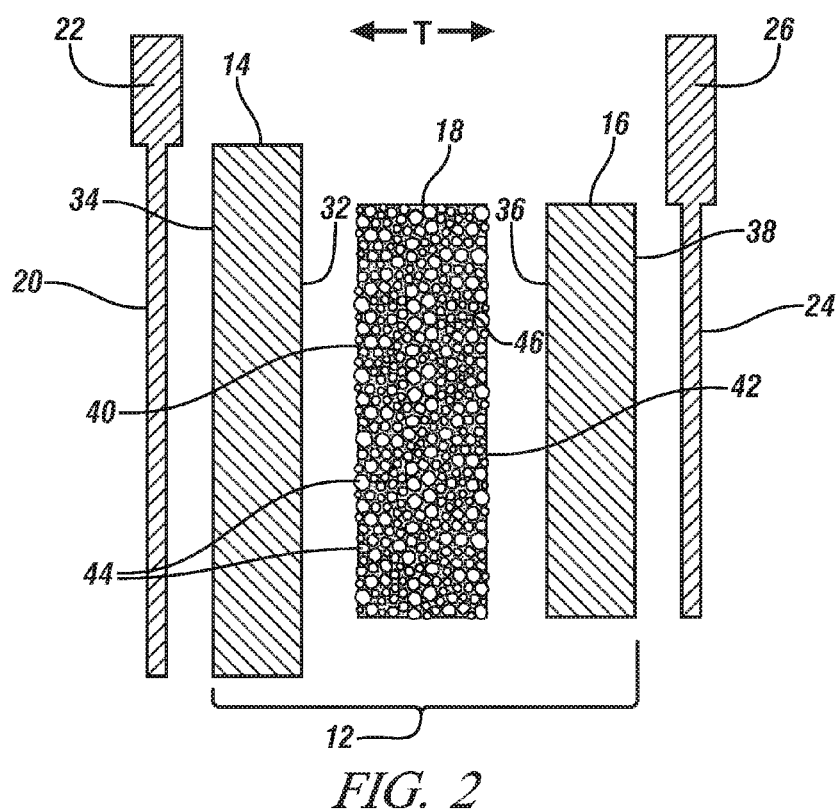
FIG. 2 is an enlarged, exploded cross-sectional view of one of the electrochemical battery cells shown in FIG. 1 along with its associated metallic current collectors. The components of the electrochemical battery cell and the metallic current collectors are idealized representations that are not necessarily drawn to scale.

An exploded cross-sectional view of the electrochemical battery cell 12 and its associated metallic current collectors 20, 24 is generally illustrated in FIG. 2. The negative electrode 14 includes an inner face surface 32 and an outer face surface 34 relative to the location of the separator 18. The positive electrode 16 similarly includes an inner face surface 36 and an outer face surface 38. The inner face surface 32 of the negative electrode 14 may, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 and a positive-side major face surface 42 of the separator 18, respectively, under the applied compressive force F. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 is formed against the outer face surface 34 of the negative electrode 14 and the positive-side metallic current collector 24 is formed against the outer face surface 38 of the positive electrode 16. Both of the metallic current collectors 20, 24 engage their respective electrode outer face surfaces 34, 38 over an appreciable interfacial surface area to facilitate the efficient collection and distribution of free electrons.

The electrochemical cell 12 is generally thin and flexible. A typical thickness of the electrochemical cell 12 extending from the outer face surface 34 of the negative electrode 12 to the outer face surface 38 of the positive electrode 16 is about 80 µm to about 350 µm. Each electrode 14, 16 is preferably about 30 µm to 150 µm thick and the separator 18 is preferably about 20 µm to 50 µm thick. The metallic current collectors 20, 24 are normally about 5 µm to 20 µm thick. The relatively thin and flexible nature of the electrochemical battery cell 12 and its associated metallic current collectors 20, 24 allows them to be rolled, folded, bent, or otherwise maneuvered into a variety of lithium ion battery configurations depending on design specifications and spatial constraints. The lithium ion battery 10 may, for example, include a number of distinct electrochemical battery cells 12 that have been fabricated, cut, aligned, and layed-up next to one another or, in an alternative embodiment, the cells 12 may be derived from a continuous layer that is folded back-and-forth over itself many times.

The negative electrode 14 includes a lithium host material that stores intercalated lithium at a relatively low electrochemical potential (relative to a lithium metal reference electrode) such as, for example, graphite or lithium titanate. The lithium host material may be intermingled with a polymeric binder material to provide the negative electrode 14 with structural integrity. The lithium host material is preferably graphite and the polymeric binder material is preferably one or more of polyvinyldiene fluoride (PVdF), an ethylene propylene diene monomer (EPDM) rubber, or a carboxymethoxy cellulose (CMC). Graphite is normally used to make the negative electrode 14 because, on top of being relatively inert, its layered structure exhibits favorable lithium intercalation and deintercalation characteristics which help provide the electrochemical battery cell 12 with a suitable energy density. Commercial forms of graphite that may be used to construct the negative electrode 14 are available from Timcal Graphite and Carbon (headquartered in Bodio, Switzerland), Lonza Group (headquartered in Basel, Switzerland), and Superior Graphite (headquartered in Chicago, Ill.). The negative-side metallic current collector 20 associated with the negative electrode 14 is preferably a thin-film copper foil that coextensively contacts the outer face surface 34 of the negative electrode 14.

The positive electrode 16 includes a lithium-based active material that stores intercalated lithium at a higher electrochemical potential than the lithium host material used to make the negative electrode 14 (also relative to a lithium metal reference electrode). The same polymeric binder materials that may be used to construct the negative electrode 14 (PVdF, EPDM, CMC) may also be intermingled with the lithium-based active material to provide the positive electrode 16 with structural integrity. The lithium-based active material is preferably a layered lithium transition metal oxide, such as lithium cobalt oxide ($LiCoO_2$), a spinel lithium transition metal oxide, such as spinel lithium manganese oxide ($LiMn_xO_y$), a lithium polyanion, such as a nickel-manganese-cobalt oxide [$Li(Ni_xMn_yCo_z)O_2$], lithium iron phosphate ($LiFePO_4$), or lithium fluorophosphate ($Li_2FePO_4F$), or a mixture of any of these materials. Some other suitable lithium-based active materials that may be employed as all or part of the lithium-based active material include lithium nickel oxide ($LiNiO_2$), lithium aluminum manganese oxide ($Li_xAl_yMn_{1-y}O_2$) and lithium vanadium oxide ($LiV_2O_5$), to name but a few alternatives. The positive-side metallic current collector 24 associated with the positive electrode 16 is preferably a thin-film aluminum foil that coextensively contacts the outer face surface 38 of the positive electrode 16.

The separator 18, as shown best in FIG. 2, is comprised predominantly of heat-resistant particles 44 held together by a small amount of a porous inert polymer material 46. The heat-resistant particles 44 have a diameter that ranges from about 0.01 µm to about 10 µm. They are randomly stacked to a thickness T of the separator 18 that preferably ranges from about 25 µm to about 50 µm. Such stacking naturally forms a coextensive network of interconnected interstices around the particles 46 and through the separator 18 from one side to the other. The outermost, surface-exposed heat resistant particles 44 delineate the major face surfaces 40, 42 of the separator 18. The interstices formed between the heat-resistant particles 44 are occupied by the porous inert polymer material 46. In terms of the composition of the separator 18, the heat-resistant particles 44 are present at about 75 wt. % to about 95 wt. % and, preferably, about 85 wt. % to about 95 wt. %, while the porous inert polymer material 46 is present at about 5 wt. % to about 25 wt. % and, preferably, about 5 wt. % to about 15 wt. %.

The separator 18 functions as a thin and electrically insulative mechanical barrier layer that physically separates the confronting inner face surfaces 32, 36 of the electrodes 14, 16 to prevent a short-circuit in the electrochemical battery cell 12. The separator 18 is also sufficiently porous to permit infiltration of the liquid electrolyte solution and the internal passage of dissolved lithium ions. Compression of the separator 18 within the electrochemical battery cell 12 presses the heat-resistant particles 44 exposed along the major face surfaces 40, 42 of the separator 18 against the corresponding inner face surfaces 32, 36 of the electrodes 14, 16. The intervening heat-resistant particles 44 located between the major face surfaces 40, 42 are closely situated so they can shift and interact with each other to structurally support the thickness T of the separator 18 should the porous inert polymer material 46 begin to lose its binding capability on account of elevated temperatures.

The heat-resistant particles 44 contained in the separator 18 are thermally stable at temperatures below 250° C. The high content of the heat-resistant particles 44 amassed between the confronting inner face surfaces 32, 36 of the electrodes 14, 16 provides the separator 18 with robust thermal and chemical stability well above 130° C. A wide variety of materials may constitute the heat-resistant particles 44 such as ceramic particles, cross-linked thermoset polymer particles, engineering thermoplastic polymer particles, or a mixture of one or more of these types of particles. Some examples of suitable ceramic particles include alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, and mixtures thereof. Some examples of suitable cross-linked thermoset polymer particles include those of polyimides, polyurethanes, phenol-formaldehyde resins, melamine formaldehyde resins, epoxy resins, and mixtures thereof. Some examples of suitable engineering thermoplastic polymer particles include those of a polyimide, polyethylene terephthalate, polyphenylene sulfide, polyetherketone, polyether ether ketone, polyphenylsulfone, a polysulfone, and mixtures thereof.

The porous inert polymer material 46 that holds together the heat-resistant particles 44 may be any polymer material suitable for use in the operating environment of the electrochemical battery cell 12. The void volume of the pores defined in the porous inert polymer material 46 is preferably in the range of about 20% to about 80%. The very small size of the dissolved lithium ions contained in the liquid electrolyte solution can easily migrate around the heat-resistant particles 44 and through such pores without much resistance. The porous inert polymer material 46 contained in the separator 18, although typically present at all times, is not necessarily needed to sustain separation of the confronting inner face surfaces 32, 36 of the electrodes 14, 16 once the electrochemical battery cell 12 is assembled; rather, it is more instrumental in allowing the separator 18 to be handled and situated between the electrodes 14, 16 during assembly of the electrochemical battery cell 12. A few specific examples of the porous inert polymer material 46 include polyetherimide (PEI), polyvinylidene fluoride (PVdF), polyacrylonitrile (PAN), poly(methyl methacrylate) (PMMA), polyoxymethylene (POM), and mixtures thereof.

A rise in temperature that breaches 130° C. in the electrochemical cell 12 can be endured by the separator 18 without a sacrifice in functionality. The heat-resistant particles 44 will not soften, melt, swell, or chemically react with the liquid electrolyte solution even at the extreme ends of the conceivable operating temperature window of the lithium ion battery 10; rather, as a consequence of the applied compressive force F, they simply remain compressed in place between the inner face surfaces 32, 36 of the electrodes 14, 16 regardless of the effect the heat may have on the porous inert polymer material 46. The possibility that the porous inert polymer material 46 may soften or melt at elevated temperatures does not significantly impact the structure or functionality of the separator 18. The applied compressive force F prevents collapse and fragmentation of the heat-resistant particles 44 that mostly constitute the separator 18 should the porous inert polymer material 46 soften or melt. The compressive and frictional forces acting on the heat-resistant particles 44 are generally strong enough to withstand the effects of volumetric, structural, and/or phase changes that may occur in the porous inert polymer material 46. In fact, upon softening or melting, the porous inert polymer material 46 would likely stay confined to a localized spatial volume defined by surrounding heat-resistant particles 46 and then re-solidify when the temperature falls to a sufficient extent.

The liquid electrolyte solution infiltrated into the separator 18, and which wets both electrodes 14, 16, is preferably a lithium salt dissolved in a non-aqueous solvent. Some suitable lithium salts that may be used to make the liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiPF_6$, and a mixture that includes one or more of these salts. The non-aqueous solvent in which the lithium salt is dissolved may be a cyclic carbonate (i.e., ethylene carbonate, propylene carbonate), an acyclic carbonate (i.e., dimethyl carbonate, diethyl carbonate, ethylmethylcarbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a mixture that includes one or more of these solvents.

Referring back to FIG. 1, the negative and positive terminals 28, 30 of the lithium ion battery 10 may be connected to an electrical device 50 that generally encompasses power-consuming and power-generating devices. A power-consuming device is one that is powered fully or partially by the lithium ion battery 10 when operating in a discharge state. Conversely, a power-generating device is one that charges or re-powers the lithium ion battery 10. The power-consuming device and the power-generating device can be the same device in some instances. For example, the electrical device 50 may be an electric motor for a hybrid electric or an extended range electric vehicle that is designed to draw an electric current from the lithium ion battery 10 during acceleration and provide a regenerative electric current to the lithium ion battery 10 during deceleration. The power-consuming device and the power-generating device can also be different devices. For example, the power-consuming device may be an electric motor for a hybrid electric or an extended range electric vehicle and the power-generating device may be an AC wall outlet, an internal combustion engine, and/or a vehicle alternator.

The lithium ion battery 10 can provide a useful electrical current to the electrical device 50 by way of reversible electrochemical reactions that occur in the electrochemical battery cell 12 when a closed-circuit connects the negative terminal 28 and the positive terminal 30 at a time when the negative electrode 14 contains a sufficient quantity of intercalated lithium (i.e., battery discharge). The electrochemical potential difference between the negative electrode 14 and the positive electrode 16—approximately 2.5 to 4.3V depending on the composition of the electrodes 14, 16—drives the oxidation of intercalated lithium contained in the negative electrode 14. Free electrons produced by this oxidation reaction are collected by the negative-side current collector 20 and supplied to the negative terminal 28. A flow of free electrons is harnessed and directed through the electrical device 50 from the negative terminal 28 to the positive terminal 30 and eventually to the positive electrode 16 by way of the positive-side current collector 24. Lithium ions, which are also produced at the negative electrode 14, are concurrently carried through the separator 18, more specifically through the interstices between the heat-resistant particles 44 occupied by the porous inert polymer material 46, by the liquid electrolyte solution in route to the positive electrode 16. The flow of free electrons through the electrical device 50 from the negative terminal 28 to the positive terminal 30 can be continuously or intermittently provided until the negative electrode 14 is depleted of intercalated lithium and the capacity of the electrochemical battery cell 12 is spent.

The lithium ion battery 10 can be charged or re-powered at any time by applying an external voltage originating from the electrical device 50 to the electrochemical battery cell 12 to reverse the electrochemical reactions that occur during discharge. The applied external voltage compels the otherwise non-spontaneous oxidation of intercalated lithium contained in the positive electrode 16 to produce free electrons and lithium ions. The free electrons are collected by the positive-side current collector 24 and supplied to the positive terminal 30. A flow of the free electrons is directed to the negative terminal 28 and eventually to the negative electrode 14 by way of the negative-side current collector 20. The lithium ions are concurrently carried back through the separator 18 in the liquid electrolyte solution towards the negative electrode 14. The lithium ions and the free electrons eventually reunite and replenish the negative electrode 14 with intercalated lithium to prepare the electrochemical battery cell 12 for another discharge phase.

The separator 18 employed in at least one of the electrochemical battery cells 12 can be fabricated by a phase-separation process in which the porous inert polymer material 46 is precipitated out of a polymer solution that has been imbibed into the interstices of a layer of the heat-resistant particles 44. The free-standing separator 18 produced by this process is handleable and can be assembled into the electrochemical battery cell 12 between the negative and positive electrodes 14, 16 by conventional techniques without falling apart. The separator 18 is situated between the negative and positive electrodes 14, 16 under the applied compressive force F so that the heat-resistant particles 44 extend between the confronting inner face surfaces 32, 36 of the electrodes 14, 16 to provide an electrically insulative physical barrier that will not lose its functionality when exposed to temperatures that exceed 130° C. The porous inert polymer material 46 contained in the separator 18 holds the heat-resistant particles 44 together into a handleable, unified mass to help facilitate assembly of the electrochemical battery cell 12. After the electrochemical battery cell 12 is assembled under the applied compressive force F, the porous inert polymer material 46, as already mentioned, is not necessarily needed to sustain separation of the confronting inner face surfaces 32, 36 of the electrodes 14, 16 during operation of the lithium ion battery 10.

The phase-separation separator fabrication process involves forming a layer of the heat-resistant particles to a thickness consistent with the desired thickness of the separator 18. To form this layer, a liquid dispersion of the heat-resistant particles 44 may be applied to a surface at a generally uniform thickness by any suitable technique followed by removal of the liquid. An organic solvent such as, for example, dimethylforamide (DMF), dimethyl sulfoxide (DMSO), N-methylpyrrolidone (NMP), or acetonitrile, may be used to form the liquid dispersion of the heat-resistant particles 44. Suitable techniques for applying the liquid dispersion include spraying, doctor blading, slot die coating, comma bar coating, and/or liquid extrusion, all of which are known techniques generally understood by skilled artisans. The layer of the heat-resistant particles 44 is preferably formed on a flat surface to a thickness that is generally the same as the intended thickness of the prepared separator (i.e., 20-50 μm) although it may be a few millimeters thicker to account for shrinkage.

The layer of the heat-resistant particles 44 is then soaked with the polymer solution. The polymer solution preferably has a viscosity of about 10 cP or less and includes a relatively small amount an inert polymer material, for example, between about 0.1 and 15 wt. %, dissolved in a miscible solvent mixture conducive to polymer phase separation. The miscible solvent mixture contains a polymer solvent and a polymer non-solvent with a higher boiling point than the polymer solvent. The polymer solvent and the polymer non-solvent are relative categorizations that refer to their ability to dissolve the inert polymer material. The polymer solvent can dissolve the small amount of the inert polymer material contained in the polymer solution while the polymer non-solvent, at the boiling point of the polymer solvent, cannot. A wide variety of solvents may be employed as the polymer solvent and the polymer non-solvent. For example, acetone (bp=56° C.) may be used as the polymer solvent and water (bp=100° C.) may be used as the polymer non-solvent. An appropriate volumetric ratio of the polymer solvent to the polymer non-solvent in the miscible solvent mixture ranges from about 5:1 to about 120:1, more preferably about 10:1 to about 110:1, and most preferably about 40:1 to about 100:1.

The layer of the heat-resistant particles 44 imbibed with the polymer solution is then heated to precipitate the porous inert polymer material 46 between the particles 44 by phase-separation. The applied heat does not affect the heat-resistant particles 44 but does selectively evaporate the polymer solvent first followed by the polymer non-solvent. Evaporating the polymer solvent first causes the concentration of the polymer solvent in the polymer solution to decrease. Eventually, the polymer solvent concentration decreases to the point where the dissolved inert polymer material, which is soluble in the polymer solvent but insoluble in the polymer non-solvent, begins to precipitate out of the polymer solution within the interstices present between the heat-resistant particles 44. The precipitated inert polymer material and the polymer non-solvent remain significantly intermingled but phase separated at this point. The polymer non-solvent includes, at most, a negligible amount of dissolved inert polymer material and its eventual evaporation leaves behind empty pores that provide the ascribed porosity to the porous inert polymer material 46.

When the miscible solvent mixture is completely evaporated, the porous inert polymer material 46, which has a porosity of about 20% to 80%, is formed coextensively throughout the interstices naturally contained in the layer of the heat-resistant particles 44. The binding strength of the porous inert polymer material 46 is sufficient to hold the heat-resistant particles 44 together into a thin, handleable, and unified layer.

EXAMPLE

This Example demonstrates the ionic conductivity, electrochemical cell cycle performance, and thermal stability of a separator comprised predominantly of heat resistant-particles, as described above, in comparison to a conventional monolayer polypropylene lithium ion battery separator obtained from Celgard, LLC (Charlotte, N.C.). The separator comprised predominantly of the heat-resistant particles is referred to in the remainder of this Example as the "inventive separator" for brevity.

The inventive separator was formed by a phase separation process, as described above. To begin, alumina particles having a diameter of 1 μm were dispersed in dimethylforamide (DMF). The dispersion of alumina particles was then spread on a glass plate using a doctor blade. The glass plate was placed in an oven set at 80° C. and the DMF was evaporated to form a layer of the alumina particles. A polymer solution that contained 5 wt. % polyvinyldiene fluoride (PVdF) dissolved in a miscible solvent mixture was then spread over the top of the layer of alumina particles to imbibe the polymer solution into the interstices between the many particles. The miscible solvent mixture contained acetone and water in a volumetric ratio of acetone to water of about 59:1 (i.e., the polymer solution contained 93 wt. % acetone, 2 wt. % water, and 5 wt. % PVdF). The layer of alumina particles imbibed with the polymer solution was then heated to evaporate off the miscible solvent mixture. Afterwards, the PVdF-bound layer of alumina particles, which contained about 90 wt. % alumina particles and about 10 wt. % porous PVdF, and was about 25 μm thick, was peeled off of the glass plate as the inventive separator.

The effective ionic conductivities of the inventive separator and the conventional monolayer polypropylene separator were determined by placing the separators, which were soaked with 1 M $LiPF_6$ in ethylene carbonate/diethyl carbonate (1:2 volumetric ratio) as the liquid electrolyte solution, between two stainless steel electrodes. An impedance analyzer was used to measure the bulk resistance across the separators. The effective ionic conductivity ($\sigma_{eff}$) of each separator was then calculated by the following equation in which t is the thickness of the separator, S is the surface area of each face of the separator, and $R_b$ is the bulk resistance as measured by the impedance analyzer.

$$\sigma(\text{mS/cm}) = \frac{t}{R_b \times S}$$

The effective conductivities of the inventive separator and the conventional monolayer polypropylene separator are shown below in Table 1. The inventive separator demonstrated a better effective ionic conductivity.

TABLE 1

Effective Ionic Conductivity

| Separator | t (μm) | S (cm$^2$) | $R_b$ (Ω) | $\sigma_{eff}$ (mS/cm) |
|---|---|---|---|---|
| Inventive Separator | 25 | 6.6 | 0.27 | 1.40 |
| Celgard 2400 | 25 | 6.6 | 0.39 | 0.97 |

Figure 3:
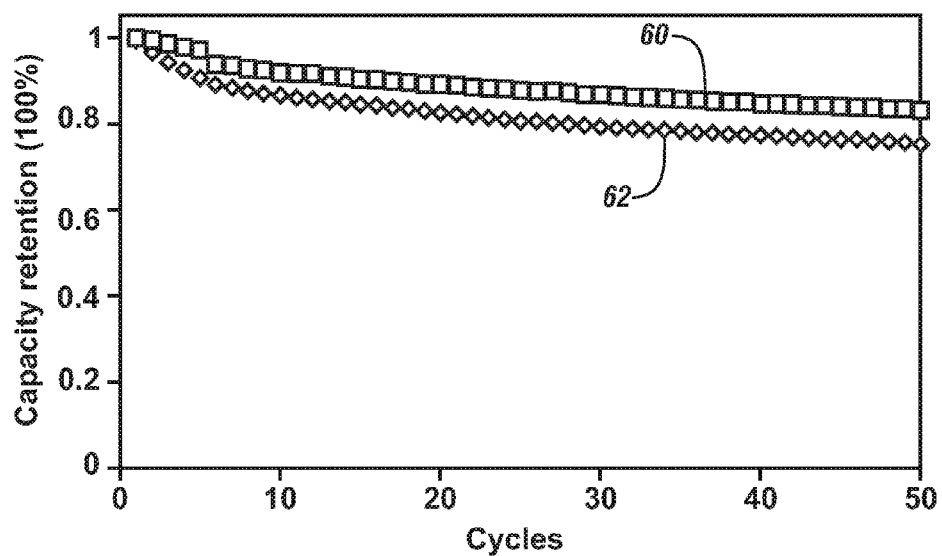
FIG. 3 is a graph that compares the thermal stability of a specific and exemplary separator comprised predominantly of heat resistant-particles and a conventional monolayer polypropylene separator.

The cycle performance of the inventive separator and the conventional monolayer polypropylene separator is shown in FIG. 3. The cycle performance testing was carried out with a Maccor Series 4000 battery tester at 30° C. The negative electrode and the positive electrode materials used were LiNi$_{1/3}$Co$_{1/3}$Mn$_{1/3}$O$_2$ (TODA NCM-01$^{ST}$-100) and graphite (TIMREX SLP 30), respectively. Carbon black (TIMREX super P Li carbon black) was used in both electrodes as a conductive additive and PVdF (Kynar HSV 900 from Arkema Inc., Philadelphia, Pa.) was used as the polymeric binder material to provide structural integrity to the electrodes. Two CR2325-type coin cells were assembled with the electrodes, one or the other of the separators (inventive or conventional), and 1 M LiPF$_6$ in ethylene carbonate/diethyl carbonate (1:2 volumetric ratio) as the liquid electrolyte solution. The cells were charged to 4.3 V under a constant-current constant-voltage mode, and then discharged to 3.0 V under a constant-current mode. For the cycle test, the cells were charged and discharged at a C/5 rate (charge/discharge occurred over 5 hours) for the first ten cycles, and then charged and discharged at a C/2 rate (charge/discharge occurred over 2 hours) for the remaining cycles. The percent of capacity retained for the cell with the inventive separator (identified as plot 60) and the cell with the conventional monolayer polypropylene separator (identified as plot 62) were plotted after each completed cycle up to 50 cycles. As shown in FIG. 3, the cell that contained the inventive separator demonstrated better capacity retention than the cell that contained the conventional monolayer polypropylene separator.

Figure 4:
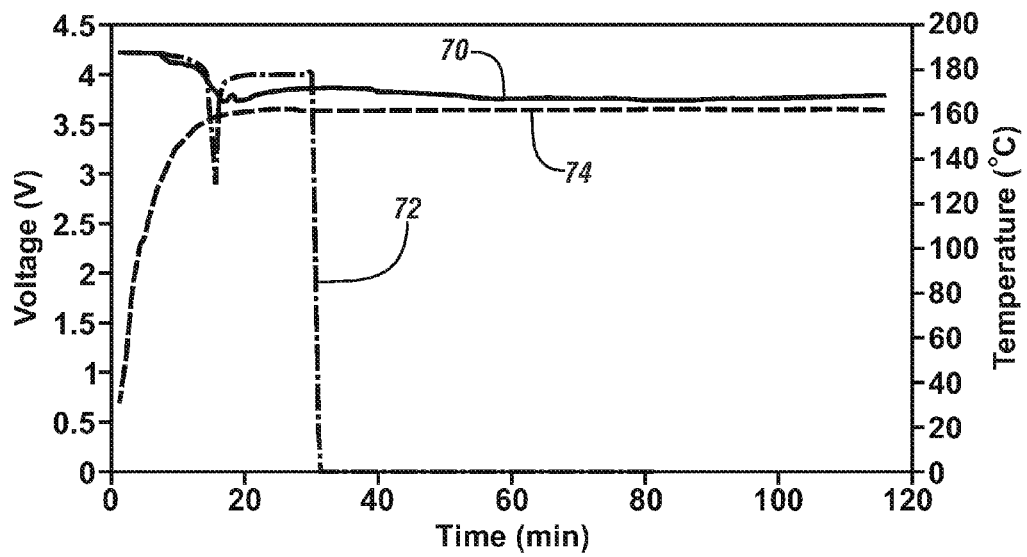
FIG. 4 is a graph that compares the cycle performance of a specific and exemplary separator comprised predominantly of heat resistant-particles and a conventional monolayer polypropylene separator.

The thermal stability of the inventive separator and the conventional monolayer polypropylene separator is shown in FIG. 4. An accelerating rate calorimeter (ARC® from Netzsch) was used to measure the cell voltage response at elevated temperatures of the two CR2325-type coin cells previously mentioned (one with the inventive separator and one with the conventional separator). The cells were charged to 4.3 V and then placed in the ARC vessel for heating to a desired temperature. The skin cell temperature was maintained at 160° C. and the open cell circuit voltage was recorded as a function of time. The voltage of the cell that contained the inventive separator (identified as line 70), the voltage of the cell that contained the conventional monolayer polypropylene separator (identified as line 72), and the skin cell temperature of the cells (identified as line 74) were each plotted against time. As shown in FIG. 4, the cell with the inventive separator demonstrated a much better thermal stability than the cell with the conventional monolayer polypropylene separator. The cell with the inventive separator suffered a slight open cell voltage drop down to around 3.7 V but remained steady for the remainder of the test. The cell with the conventional monolayer polypropylene separator, on the other hand, completely failed after about 30 minutes as softening and melting of the polypropylene separator led to a short circuit.

The above description of exemplary embodiments and specific examples are merely descriptive in nature and not intended to limit the scope of the claims that follow.

The invention claimed is:

1. A secondary lithium ion battery that comprises a plurality of electrochemical battery cells connected in series or in parallel, at least one of the electrochemical battery cells comprising:
   a negative electrode that includes an inner face surface;
   a positive electrode that includes an inner face surface that confronts the inner face surface of the negative electrode; and
   a separator situated between the negative electrode and the positive electrode that includes a negative-side major face surface and a positive-side major face surface, the negative side major face surface and the positive-side major face surface being pressed against the inner face surface of the negative electrode and the inner face surface of the positive electrode, respectively, under an applied compressive force, the separator comprising:
      an amount of heat-resistant particles that have diameters ranging from about 0.01 μm to about 10 μm, the heat-resistant particles being stacked to a thickness of the separator, which ranges from about 20 μm to about 50 μm, so as to delineate and extend all the way through the separator between the negative-side major face surface and the positive-side major face surface of the separator, the stacking of the heat-resistant particles defining interstices between the particles and causing heat-resistant particles at the negative-side and positive-side major face surfaces to experience pressed contact with the inner face surfaces of the negative and positive electrodes, the amount of the heat-resistant particles present in the separator ranging from about 75 wt. % to about 95 wt. %; and
   an amount of a porous inert polymer material that occupies the interstices formed between the heat-resistant particles the amount of the porous inert polymer material present in the separator ranging from about 25 wt. % to about 5 wt. %.

2. The lithium ion battery of claim 1, further comprising:
   a negative-side current collector that is formed against an outer face surface of the negative electrode, the outer face surface of the negative electrode facing opposite the inner face surface of the negative electrode;
   a positive-side current collector that is formed against an outer face surface of the positive electrode, the outer face surface of the positive electrode facing opposite the inner face surface of the positive electrode; and
   a liquid electrolyte solution that is infiltrated into the separator and wets both the negative and positive electrodes, the liquid electrolyte solution being able to communicate lithium ions between the negative and positive electrodes and through the separator.

3. The lithium ion battery of claim 1, wherein the negative electrode includes a lithium host material and the positive electrode includes a lithium-based active material, wherein each of the lithium host material and the lithium-based active material stores intercalated lithium, and wherein the lithium-based active material stores intercalated lithium at a higher electrochemical potential, relative to a lithium metal reference electrode, than the lithium host material.

4. The lithium ion battery of claim 1, wherein the heat-resistant particles comprise ceramic particles, cross-linked thermoset polymer particles, engineering thermoplastic polymer particles, or a mixture thereof.

5. The lithium ion battery of claim 4, wherein the heat-resistant particles comprise particles of at least one of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, a polyimide, a polyurethane, a phenol-formaldehyde resin, a melamine formaldehyde resin, an epoxy resin, polyethylene terephthalate, polyphenylene sulfide, polyetherketone, polyether ether ketone, polyphenylsulfone, polysulfone, or a mixture thereof.

6. The lithium ion battery of claim 1, wherein the porous inert polymer material contains pores that provide the porous inert polymer material with a void volume of about 20% to about 80%.

7. The lithium ion battery of claim 1, wherein the porous inert polymer material comprises polyetherimide, polyvinylidene fluoride, polyacrylonitrile, poly(methyl methacrylate), polyoxymethylene, or a mixture thereof.

8. The lithium ion battery set forth in claim 4, wherein the heat-resistant particles comprise at least one of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, or a mixture thereof.

9. The lithium ion battery set forth in claim 4, wherein the heat-resistant particles comprise at least one of a polyimide, a polyurethane, a phenol-formaldehyde resin, a melamine formaldehyde resin, an epoxy resin, or a mixture thereof.

10. The lithium ion battery set forth in claim 4, wherein the heat-resistant particles comprise at least one of a polyimide, polyethylene terephthalate, polyphenylene sulfide, polyetherketone, polyether ether ketone, polyphenylsulfone, polysulfone, or a mixture thereof.

11. The lithium ion battery set forth in claim 1, wherein the amount of the heat-resistant particles present in the separator ranges from about 85 wt. % to about 95 wt. % and the amount of the porous inert polymer material present in the separator ranges from about 15 wt. % to about 5 wt. %.

12. A lithium ion battery that comprises a plurality of electrochemical battery cells, at least one of the electrochemical battery cells comprising:
a negative electrode that includes an inner face surface;
a positive electrode that includes an inner face surface that confronts the inner face surface of the negative electrode;
a separator situated between the negative electrode and the positive electrode and including a negative-side major face surface and a positive-side major face surface that define a thickness of the separator ranging from 20 μm to 50 μm, the negative-side major face surface and the positive-side major face surface being pressed against the inner face surface of the negative electrode and the inner face surface of the positive electrode, respectively, under an applied compressive force, the separator comprising heat-resistant particles that are stacked across the thickness of the separator so as to delineate the negative-side major face surface and the positive-side major face surface and to extend all the way between the negative-side major face surface and the positive-side major face surface, the heat-resistant particles having diameters ranging from 0.01 μm to 10 μm and the stacking of the heat-resistant particles defining interstices between the particles and causing heat-resistant particles at the negative-side and positive-side major face surfaces to experience pressed contact with the inner face surfaces of the negative and positive electrodes, the separator further comprising a porous inert polymer material that occupies the interstices formed between the heat-resistant particles, and wherein the separator includes 75 wt. % to 95 wt. % of the heat-resistant particles and 25 wt. % to 5 wt. % of the porous inert polymer material; and
a liquid electrolyte solution that is infiltrated into the separator and wets both the negative and positive electrodes, the liquid electrolyte solution being able to communicate lithium ions between the negative and positive electrodes and through the separator.

13. The lithium ion battery set forth in claim 12, wherein the negative electrode includes a lithium host material and the positive electrode includes a lithium-based active material, wherein each of the lithium host material and the lithium-based active material stores intercalated lithium, and wherein the lithium-based active material stores intercalated lithium at a higher electrochemical potential, relative to a lithium metal reference electrode, than the lithium host material.

14. The lithium ion battery set forth in claim 12, wherein the heat-resistant particles comprise at least one of alumina, titania, silica, ceria, zirconia, silicon carbide, boron carbide, titanium nitride, silicon nitride, titanium silicide, tungsten silicide, aluminum boride, titanium boride, mullite, spodumene, zirconium silicate, sillimanite, petalite, or a mixture thereof.

15. The lithium ion battery set forth in claim 12, wherein the heat-resistant particles comprise at least one of a polyimide, a polyurethane, a phenol-formaldehyde resin, a melamine formaldehyde resin, an epoxy resin, or a mixture thereof.

16. The lithium ion battery set forth in claim 12, wherein the heat-resistant particles comprise at least one of a polyimide, polyethylene terephthalate, polyphenylene sulfide, polyetherketone, polyether ether ketone, polyphenylsulfone, polysulfone, or a mixture thereof.

* * * * *